United States Patent
Ohtani et al.

(10) Patent No.: US 7,507,490 B2
(45) Date of Patent: Mar. 24, 2009

(54) METAL SEPARATOR FOR FUEL CELL AND ITS PRODUCTION METHOD

(75) Inventors: Teruyuki Ohtani, Wako (JP); Makoto Tsuji, Wako (JP); Masao Utsunomiya, Wako (JP); Koji Kotani, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 83 days.

(21) Appl. No.: 10/496,317

(22) PCT Filed: Nov. 1, 2002

(86) PCT No.: PCT/JP02/11467

§ 371 (c)(1),
(2), (4) Date: Sep. 22, 2004

(87) PCT Pub. No.: WO03/049220

PCT Pub. Date: Jun. 12, 2003

(65) Prior Publication Data

US 2005/0051431 A1    Mar. 10, 2005

(30) Foreign Application Priority Data

| Dec. 7, 2001 | (JP) | 2001-373740 |
| Dec. 21, 2001 | (JP) | 2001-390216 |
| Dec. 27, 2001 | (JP) | 2001-396168 |
| Dec. 28, 2001 | (JP) | 2001-399629 |
| Mar. 15, 2002 | (JP) | 2002-072786 |

(51) Int. Cl.
   *H01M 2/00* (2006.01)
(52) U.S. Cl. .............................. 429/34; 429/38; 205/57
(58) Field of Classification Search .................. 429/129, 429/143, 34
   See application file for complete search history.

(56) References Cited

U.S. PATENT DOCUMENTS 6,379,476 B1 *   4/2002   Tarutani et al. ............. 148/325

FOREIGN PATENT DOCUMENTS

| DE | 600 09 781 T2 | 3/2005 |
| JP | 51-113290 | 10/1976 |
| JP | 2000-323152 | 11/2000 |
| JP | 2001-214286 | 8/2001 |
| JP | 2001-283872 | 10/2001 |

* cited by examiner

*Primary Examiner*—Patrick Ryan
*Assistant Examiner*—Ben Lewis
(74) *Attorney, Agent, or Firm*—Arent Fox LLP

(57) ABSTRACT

A metallic separator in which falling off of the conductive inclusions projecting from a matrix surface is prevented, whereby the contact resistance is decreased, resulting in increasing the characteristics for generation of electrical energy. A metallic separator for a fuel cell comprises conductive inclusions in a metal structure, and the conductive inclusions project from a surface of a matrix to a height of 1 to 3 micrometers.

1 Claim, 9 Drawing Sheets press-forming

METAL SEPARATOR FOR FUEL CELL AND ITS PRODUCTION METHOD

CROSS-REFERENCE TO RELATED APPLICATION

This application is a National Stage entry of International Application No. PCT/JP02/1467, filed Nov. 1, 2002. The disclosure of the prior application is hereby incorporated herein in its entirety by reference.

TECHNICAL FIELD

The present invention relates to a metallic separator provided in a solid polymer fuel cell and to a production method for the same.

BACKGROUND ART

In a solid polymer fuel cell, a laminated body, in which, on both sides of a planar MEA (Membrane Electrode Assembly), a separator is laminated, is regarded as one unit, and plural units are stacked and form a fuel cell stack. The MEA is formed as a three layer structure in which, between a pair of gas diffusion electrodes that constitute a cathode and an anode, an electrolyte membrane made of, for example, an ion exchange resin, is interposed. In the gas diffusion electrode, outside of an electrode catalyst layer in contact with an electrolyte membrane, a gas diffusion layer is formed. Furthermore, the separator, laminated so as to be in contact with the gas diffusion electrode of the MEA, is provided with a gas passage that allows a gas to flow and a coolant passage between the separator and the gas diffusion electrode. According to such a fuel cell, for example when a hydrogen gas as a fuel is allowed to flow in the gas passage facing the gas diffusion electrode on the anode side, and an oxidizing gas such as oxygen or air is allowed to flow in the gas passage facing the gas diffusion electrode on the cathode side, there occurs an electrochemical reaction, resulting in the generation of electricity.

The separator must function so that, while electrons generated at the anode side according to a catalytic reaction of the hydrogen gas are supplied to an external circuit, electrons from the external circuit may be supplied to the cathode side. Accordingly, for the separator, a conductive material made of a graphite-based material or a metal-based material is used, and in particular the metal based material is regarded as being advantageous in view of superiority in mechanical strength and in ability to be made lighter and more compact by being formed into a thin plate. As a metallic separator, one in which, for example, a thin plate of stainless steel on a surface of which conductive inclusions that form a conductive passage are dispersed and exposed, is press-formed into the gas passage and the coolant passage can be cited. However, these separators have subjects (1) to (5) shown as follows. Hereinafter, these subjects and purposes of the present invention corresponding to each subject will be explained.

(1) As a metallic separator, one in which stainless steel is press-formed, in which nonmetal conductive inclusions that form a conductive passage are dispersed in the metallic structure, can be cited. This separator appears to be promising economically. However, in the stainless steel plate, the entire area of the matrix surface has a natural oxide film. Therefore, contact resistance against the MEA is high in this case, whereby characteristics for generation of electrical energy are decreased. Accordingly, after the press-forming process, a process in which the conductive inclusions made to project at the surface is performed, resulting in decreasing the contact resistance. As a process in which the conductive inclusions are made to project, for example, a means in which a matrix on the surface is eliminated by an electrolytic etching may be adopted.

However, when the conductive inclusions are merely projected from the matrix surface, a portion of the conductive inclusions can fall off from the surface, whereby a decrease of contact resistance cannot be greatly obtained.

Accordingly, the present invention first intends to provide a metallic separator for a fuel cell, in which the falling off of conductive inclusions projecting from a matrix surface is prevented, whereby the contact resistance would be decreased, resulting in increasing the characteristics for generation of electrical energy, and a production method for the same.

(2) The said gas passage and the said coolant passage are composed of grooves having two faces obtained by bending a material plate into a cross-section shape having concavities and convexities. In an outside of an R-portion which is made into a corner by the bending process, the amount of elongation on the surface is increased by tensile stress. Therefore, cracks are easily formed at boundary faces between the matrix and the conductive inclusions. FIG. 1 is a pattern diagram of this phenomenon. At the outside of the R-portion of separator 10A obtained by bending material plate 10, cracks are formed at the boundary face between matrix 20 and conductive inclusions 30. This generation of cracks induces fall off of the conductive inclusions and gap corrosion beginning at the cracks, whereby a function as a separator is decreased.

Accordingly, the present invention secondly intends to provide a metallic separator for a fuel cell, in which falling off of the conductive inclusions and forming of the cracks in boundaries between the conductive inclusions and the matrix by the bending process are suppressed, resulting in ensuring the function as a separator, and a production method for the same.

(3) The said gas passage and the said coolant passage are composed of grooves having two faces obtained by bending a material plate into a cross-section shape having concavities and convexities. In the outside of the R-portion which is the corner by the bending process, the amount of an elongation on the surface is increased by tensile stress. Therefore, cracks can be formed at the boundary face between the matrix and the conductive inclusions, whereby the conductive inclusions can fall off. In a case of using a separator in which the conductive inclusions fall off, pitting corrosion beginning at the falling off mark are generated during operation of the fuel cell, whereby the corrosion is progressed.

Accordingly, the present invention thirdly intends to provide a production method for a metallic separator for a fuel cell, in which falling off of the conductive inclusions in the press-forming is suppressed, resulting in the production of a robust separator.

(4) In the said case of using a separator in which the conductive inclusions fall off, pitting corrosion beginning at the falling off mark is generated during operation of the fuel cell, whereby the corrosion is proceeded as mentioned above, and moreover, the contact resistance is increased. Furthermore, the cracks beginning at the conductive inclusions are easily formed, depending on the shape of the conductive inclusions, and the forming of the cracks may be promoted. FIG. 2 shows an occurrence of a crack beginning at conductive inclusions 60 by a bending process in producing a separator 40A by press-forming material plate 40 of the separator. As shown in FIG. 2, in particular, conductive inclusion 60, which is precipitated in the center of the material plate 40 and in which the lengthwise length is longer than the crosswise length in cross-section, acts as a wedge hammered against matrix 50, whereby the crack 50a is promoted. In such a case, leak of fuel gas and oxidizing gas occurs, resulting in decreasing function as a separator.

Accordingly, the present invention fourthly intends to provide a production method for a metallic separator for a fuel cell, in which falling off of the conductive inclusions in the press-forming and the forming of the cracks beginning at conductive inclusions are prevented, resulting in the ability to produce durable.

(5) As a process in which the conductive inclusions are projected, the said means for the matrix on the surface to be eliminated by etching can be cited. In the case of performing the process in which the conductive inclusions project, a portion of the conductive inclusions can fall off from the surface, whereby a decreasing effect of a contact resistance was not largely obtained. For example, in the case of causing the conductive inclusions to project at the surface by an electrolytic etching, the matrix is dissolved in the process. When this happens, a portion of the matrix in the vicinity of boundary face between the matrix and the conductive inclusions is particularly easy to be selectively dissolved, whereby pitting corrosion is generated around the conductive inclusions, resulting in it being easy for the conductive inclusions to fall off.

Accordingly, the present invention fifthly intends to provide a production method for a metallic separator for a fuel cell, in which generation of pitting corrosion in the boundary face between the matrix and the conductive inclusions is prevented, in the process of projecting the conductive inclusions on the surface, whereby falling off of the conductive inclusions is prevented, resulting in decreasing the contact resistance, and accordingly increasing the characteristics for generation of electrical energy.

DISCLOSURE OF THE INVENTION

Hereinafter, the present invention corresponds to the said first to fifth purposes will be explained, in the order of the metallic separator for fuel cell and the production method for the same.

(1) The present invention provides a metallic separator for a fuel cell in accordance with the first purpose, in which conductive inclusions are in a metallic structure, and the conductive inclusions project from a surface of the matrix to a height of to 3 micrometers.

The most important characteristic in the present invention is that conductive inclusions project from a surface of the matrix to a height of 1 to 3 micrometers. When the projection amount (height) of the conductive inclusions is less than 1 micrometer, contact resistance is not adequately decreased, whereas, when the projection amount is more than 3 micrometer, the conductive inclusions can fall off from the surface of the matrix.

Furthermore, the projection of the conductive inclusions from the surface of the matrix can be a form in which only the conductive inclusions 80 project from the surface of the flat matrix 70, as shown in FIG. 3, or a form in which the surface of the matrix 70 has mount-shaped projections, and the conductive inclusions 80 project from tops of the mount-shaped projections, as shown in FIG. 4. These projection forms can be controlled by changing conditions for forming the projection process of the conductive inclusions in a production method described hereinafter.

As a material of the separator of the present invention, austenitic stainless steel plates having the conductive inclusions can be cited. Concretely, the austenitic stainless steel plate contains each component shown in Table 1 and the balance of Fe, B, and inevitable impurities, and in the material, Cr and B satisfy the following formula (A), B projects on the surface as a boride of $M_2B$ and $MB$ type or a boride of the $M_{23}(C,B)_6$ type, and these borides are conductive inclusions that form conductive passages on the surface of the separator.

$$Cr(wt\%) + 3 \times Mo(wt\%) - 2.5 \times B(wt\%) \geq 17 \qquad (A)$$

TABLE 1

| | | | | | | | | | | (wt %) |
| C | Si | Mn | P | S | Cu | Ni | Cr | Mo | Al | N |
| --- | --- | --- | --- | --- | --- | --- | --- | --- | --- | --- |
| ≦0.15 | 0.01~1.5 | 0.01~2.5 | ≦0.035 | ≦0.01 | 0~3 | 7~50 | 17~30 | 0~7 | 0.01~0.2 | ≦0.3 |

In the said stainless steel plate on which a boride is projected, two phases made of stainless steel as the parent phase and boride as a conductive inclusion exist on the surface. The conductive inclusion generally has a higher hardness than that of the parent phase. However, solubility in an acid of the conductive inclusion is less than that of the parent phase. Applying this characteristic enables control of projection forms of the conductive inclusions.

(2) The present invention provides a metallic separator for fuel cells according to the second purpose, in which conductive inclusions are in a metallic structure, the surface of the matrix has mount-shaped projections, and the conductive inclusions project from the top of the mount-shaped projections.

According to the present invention, when a bending process is performed so that the surface of a side in which the conductive inclusions project is convex, the matrix around the conductive inclusions is formed as mount-shaped, whereby the amount of the elongation is not large. Therefore, cracks are difficult to form in the boundary face between the matrix and conductive inclusions. FIG. 5 is a pattern diagram showing the said function, matrix 20 projects on the surface of the material plate 10 which has mount-shaped projections, and the conductive inclusions 30 project from a top of the mount-shaped projection. In a side of an external surface of an R-portion of separator 10A formed by a bending process of material plate 10, matrix around conductive inclusions 30 is formed to be mount-shaped, whereby tensile stress is relieved, resulting in not increasing the amount of elongation of the surface. Therefore, cracks are difficult to form at the boundary face between matrix 20 and conductive inclusions 30. Accordingly, falling off of the conductive inclusions and gap corrosion beginning at the cracks can be suppressed, whereby the functions as a separator can be ensured.

(3) The present invention provides a production method for a metallic separator for fuel cells according to the said first purpose, in which the said metallic separator for a fuel cell of the present invention can be preferably produced, the method comprises a process in which the conductive inclusions project from the surface of the matrix to a height of 1 to 3 micrometers.

As a projection forming process for the conductive inclusions in the production method of the present invention, a physical method such as sand blasting or wet blasting and a chemical method such as etching can be cited. The physical method is a method in which differences of degree of hardness between matrix and conductive inclusion are utilized, concretely in the method, only the matrix which has low degree of hardness is chipped off by impacting grains on the surface, and on the other hand, conductive inclusions which have a high degree of hardness remain in spite of chipping off, whereby the conductive inclusions project at the surface. Moreover, a chemical method is a method in which solubility in acid of the matrix and conductive inclusions is utilized; concretely, in the method, a matrix which has high solubility is selectively dissolved by dipping the matrix and conductive inclusions into nitric and/or hydrofluoric acid baths and by sprinkling with iron chloride, whereby the conductive inclusions are made to project at the surface.

In these methods, in order to project only the conductive inclusions from the flat surface of the matrix, methods in which elimination ability of the matrix is high are preferable, such as dipping into nitric and hydrofluoric acids bath or sand blasting. On the other hand, in order that the conductive inclusions project from the top of the mound of the matrix, methods in which elimination ability of matrix is relatively low are preferable, such as sprinkling or wet blasting.

(4) The present invention provides a production method for a metallic separator for fuel cells corresponding to the said second purpose, in which the said metallic separator for fuel cell of the present invention can be preferably produced. The method comprises a process in which the conductive inclusions project at the surface of the matrix by performing etching on the surface of the material plate in the separator, whereby the conductive inclusions project from the top of the mound of the matrix which is protuberant like hills, and a process in which the material plate is press-formed.

As etchings in the production process mentioned above, a chemical etching performed by sprinkling of iron chloride shower or a physical etching performed by wet blasting are preferable. When these etching methods are used, the portion of matrix which is around the conductive inclusions is difficult to etch, whereby the conductive inclusions are easy to be made to project form the top of mound of the matrix. Conventionally, in processes methods in which the conductive inclusions project from the surface of the material plate, for example, dipping into nitric and hydrofluoric acid bath is cited as a chemical etching, and dry sand blasting is cited as a physical etching. However, etching power by sprinkling of iron chloride or wet blasting of the present invention is relatively lower than that by dipping into nitric and hydrofluoric acid bath or dry sand blasting. Therefore, the portion of the matrix which is around the conductive inclusions is difficult to etch, and the portion is formed in a shape like a hill.

In addition, as a material of the separator of the present invention, an austenitic stainless steel plate which has conductive inclusions is cited. Concretely, the material comprises each component showed in Table 1, and Fe, B, and inevitable impurities as the balance, the Cr and B satisfying the formula (A). Furthermore, B is precipitated as a boride of $M_2B$ and MB types, and a boride of the $M_{23}(C, B)_6$ type on a surface thereof, these borides being conductive inclusions that form conductive paths on the surface of the separator.

(5) The present invention also intends to provide a production method for a metallic separator for a fuel cell corresponding to the said third purpose, the method comprising a condition in which a ratio of bending R value in an R portion in which the conductive inclusions can fall off by bending process, to average area in cross-section of plate thickness direction of the conductive inclusions in a material plate of the separator is defined, whereby bending R value or dimensions (diameter) in the conductive inclusions in which the conductive inclusions cannot fall off is obtained. Concretely, when minimum bending R value in press-forming is defined as r (micrometers), and the average area in cross-section of the plate thickness direction of the conductive inclusions in the material plate of the separator before the press-forming is defined as S (square of micrometers), r and S satisfy the below described formula (B) and (C).

$$1 \leq 0.56 \times S^{1/2} \tag{B}$$

$$1.77 \times S^{1/2} \div r \leq 0.1 \tag{C}$$

When a bending process in which the material plate such as the austenitic stainless steel plate is formed to have a shape having concavities and convexities is performed by press-forming, resulting in forming gas passages or coolant passages in separators, minimum bending R value is preferably about 0.1 to 0.5 mm. In this range of the R value, conditions of the present invention shown by the formulas (B) and (C) were difficult to meet by conventional stainless steel plates. This is because the diameter in the conductive inclusions was large in the conventional plate. Therefore, the present invention can be realized by controlling in refinement of the conductive inclusions by adjusting the cooling rate in casting the material or by crushing the conductive inclusions in the process of rolling the material plate. Concretely, the casting of the stainless steel is performed by stirring continuous casting, and the cooling rate (drawing rate) in the continuous casting is controlled, whereby the average diameter in the conductive inclusions generated in cooling process can be controlled. Furthermore, in producing the material plate by rolling, when rolling reduction is set to be large, the average diameter of the conductive inclusions can be controlled by crushing the conductive inclusions which is in the material. In this way, the average area S in cross-section of plate thickness direction of the conductive inclusions can be controlled by controlling the average diameter in the precipitated conductive inclusions.

The austenitic stainless steel is preferable as a material of the separator of the present invention. Concretely, the austenitic stainless steel contains each composition shown in Table 1 and the balance of Fe, B and inevitable impurities, and in the material, Cr and B satisfy the formula (A). Then, B is projected on the surface as a boride of $M_2B$ and MB type or a boride of $M_{23}(C,B)_6$ type, these borides are conductive inclusions that form conductive passages on the surface of the separator.

(6) The present invention also intends to provide a production method for a metallic separator for a fuel cell corresponding to the said fourth purpose, the production method was completed based on the finding that the falling off of the conductive inclusions generated or cracking of matrix beginning at the conductive inclusions generated by bending process mentioned above depended on a ratio of Feret diameter in face direction to Feret diameter in plate thickness direction, in the cross section of plate thickness of the precipitated conductive inclusions. That is, the present invention is a production method for a metallic separator for a fuel cell having conductive inclusions projected from the surface of the separator by press-forming, the production method including a condition that when the average value of the Feret diameter in the face direction is defined as x and average value of the Feret diameter in the plate thickness direction is defined as y, in the cross section of the plate thickness of the conductive inclusions in the matrix of the separator before press-forming, x and y satisfy $0.5 \leqq x/y \leqq 1.2$. In the Feret diameters x and y, as shown in FIG. 6, Feret diameter x is a maximum width of projection image in the face direction of material plate 40 in the conductive inclusions, and Feret diameter y is a maximum width of projection image in the plate thickness direction.

When the Feret diameters x and y can be controlled, for example, by changing the conditions in casting the materials such as a cooling rate or by changing the rolling condition. A material in which continuous casting of a slab made of austenitic stainless steel is rolled is preferably used as the material plate 40 of separator of the present invention, and the conductive inclusions 60 precipitated in the steel are deformed by crushing or lengthening by the rolling. The degree of deformation of the conductive inclusions 60 in this case, as shown in FIG. 7, comes under the larger influence of rolling, as the conductive inclusions 60 is nearer to the surface. That is, the conductive inclusions 60 are flatter along the face direction of the steel plate as the conductive inclusions 60 are nearer to the surface. On the other hand, in the vicinity of the center of the plate thickness direction, the shape of the conductive inclusions 60 in the precipitated moment (the shape with the shorter side at the top as shown in FIG. 7) can be relatively maintained. Therefore, the Feret diameters x and y of the conductive inclusions can be also controlled by grinding the surface of steel plate after the rolling.

The austenitic stainless steel is preferable as a material of the separator of the present invention. Concretely, the austenitic stainless steel contains each composition shown in Table 1 and the balance of Fe, B, and inevitable impurities, and in the material, Cr and B satisfy the said formula (A). Furthermore, B is projected on the surface as borides of $M_2B$ and MB type or a boride of $M_{23}(C,B)_6$ type, and these boride are conductive inclusions that form conductive passages on the surface of the separator.

(7) The present invention provides a production method for a metallic separator for fuel cell corresponding to the said fifth purpose, the method including a process in which a corrosive membrane is formed on the surface of the material plate of metallic separator having the conductive inclusions in the metal structure, and a process in which the conductive inclusions are projected from the surface by eliminating the surface of the matrix of the material plate in the separator by etching.

In the present invention, a stainless steel plate which is press-formed is used as a material plate of the separator, and first, the corrosive membrane forming process is performed on the surface of the material plate of the separator. According to the corrosive membrane forming process, a corrosive membrane is formed on the surface of the material plate of the separator. Secondly, the surface portion of the matrix is eliminated by etching the surface of the material plate of the separator, whereby the conductive inclusions are projected from the surface of the material plate. When the projecting process of the conductive inclusions is performed, the corrosive membrane is formed around the conductive inclusions, whereby the phenomenon in which a portion of the corrosive membrane is selectively melted by etching is difficult to occur. Therefore, generating pitting corrosion in the boundary face between matrix and conductive inclusions can be prevented, whereby falling off of the conductive inclusions is prevented. Therefore, contact resistance is decreased, resulting in increasing the characteristics for generation of electrical energy.

A passivation process is preferably used as a corrosive membrane forming process of the present invention. According to using the passivation process, a corrosive membrane is formed on the surface of the matrix by generating an oxide. As a specific method of the passivation process, a method such as a dipping into an acidic bath may be cited. Furthermore, as etchings in which the conductive inclusions are projected from the surface, chemical etchings can be utilized and electrolytic etchings which are electrochemical are preferably used.

BEST MODE FOR CARRYING OUT THE INVENTION

Hereinafter, the present invention will be explained in detail by referring to concrete practical examples. In the practical examples, the explanations are sequentially performed corresponding to the said numbers (1) to (5) of each purpose mentioned above.

(1) A Practical Example of the Present Invention in Relation to the First Purpose A. Producing a Separator

PRACTICAL EXAMPLE 1

An austenitic stainless steel plate which contains respective components shown in Table 2, balance of Fe and inevitable impurities, and has a thickness of 0.2 mm was prepared, and the stainless steel plate was cut into a 100 mm square, whereby a material plate for a separator was obtained. Next, the material plate was press-formed at a press load of 50 tons. Additionally, the press-formed material plate was dipped for 30 minutes in a nitric and hydrofluoric acid bath, which was composed of 20% nitric acid and 8% hydrofluoric acid and was held at 30° C., in a condition of jet agitation, whereby etching was performed, resulting in a separator of Practical Example 1. Additionally, a projection amount of conductive inclusions in the separator of Practical Example 1 was 2 micrometers.

TABLE 2

| C | Si | Mn | P | S | Cu | Ni | Cr | Mo | Nb | Ti | Al | N | (wt %) B |
|---|---|---|---|---|---|---|---|---|---|---|---|---|---|
| 0.073 | 0.28 | 0.13 | 0.015 | 0.001 | 0.11 | 10.1 | 20.9 | 2.03 | — | — | 0.08 | 0.03 | 0.6 |

COMPARATIVE EXAMPLE 1

A separator of Comparative Example 1 was obtained in a similar manner as in the Practical Example 1 except for not using the etching. Additionally, a projection amount of conductive inclusions in the separator of Comparative Example 1 was 0 micrometers.

COMPARATIVE EXAMPLE 2

A separator of Comparative Example 2 was obtained in a similar manner as in the Practical Example 1 except for setting the dipping time in the nitric and hydrofluoric acid bath to be 7 minutes. Additionally, a projection amount of conductive inclusions in the separator of Comparative Example 2 was 0.5 micrometers.

COMPARATIVE EXAMPLE 3

A separator of Comparative Example 3 was obtained in a similar manner as in the Practical Example 1 except for setting the dipping time in the nitric and hydrofluoric acid bath to be 60 minutes. Additionally, a projection amount of conductive inclusions in the separator of Comparative Example 3 was 4 micrometers.

B. Observation of Cross Section of Surface Layer

Figure 1:
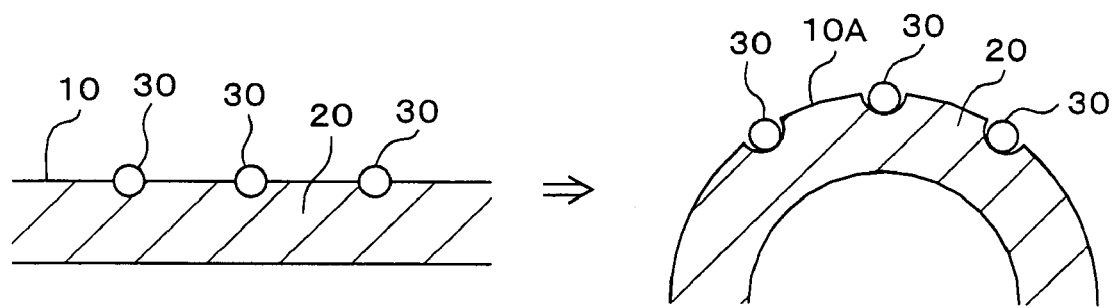
FIG. 1 is a pattern diagram for explaining the defects generated by the conventional method.
Figure 2:
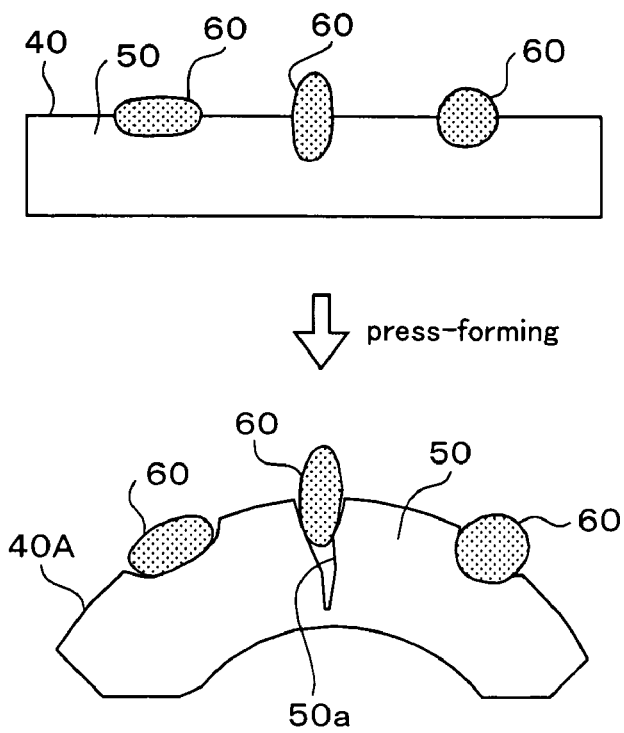
FIG. 2 is a pattern diagram showing the generating circumstance of the cracks beginning at the conductive inclusions generated in the press-forming moment of the separator.
Figure 3:
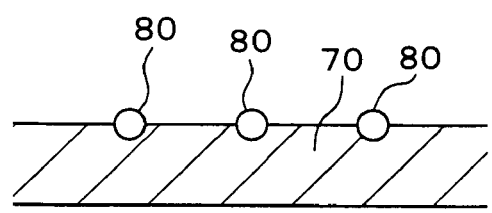
FIG. 3 is one pattern diagram showing a projection form of the conductive inclusions from the matrix in the separator of the present invention.
Figure 4:
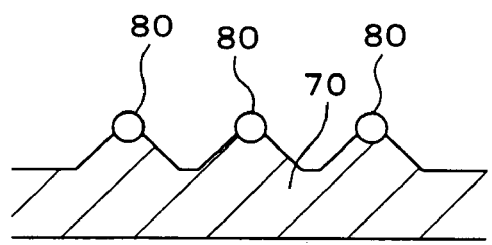
FIG. 4 is another pattern diagram showing a projection form of the conductive inclusions from the matrix in the separator of the present invention.
Figure 5:
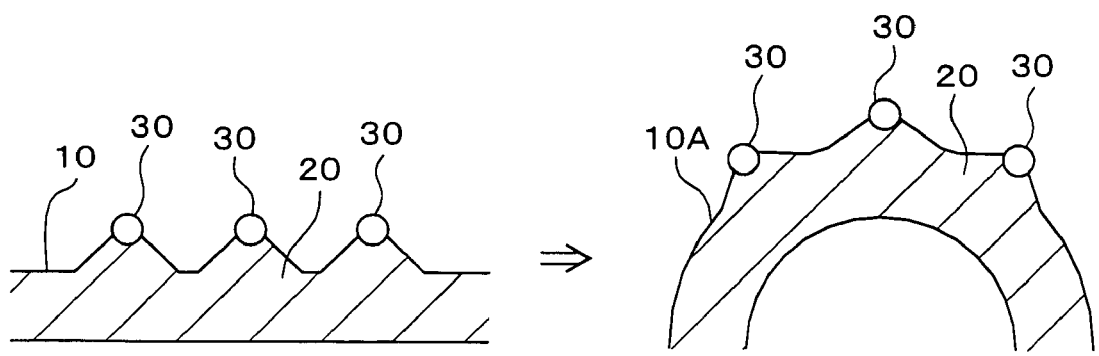
FIG. 5 is a pattern diagram showing a function by the production method for the separator of the present invention.
Figure 6:
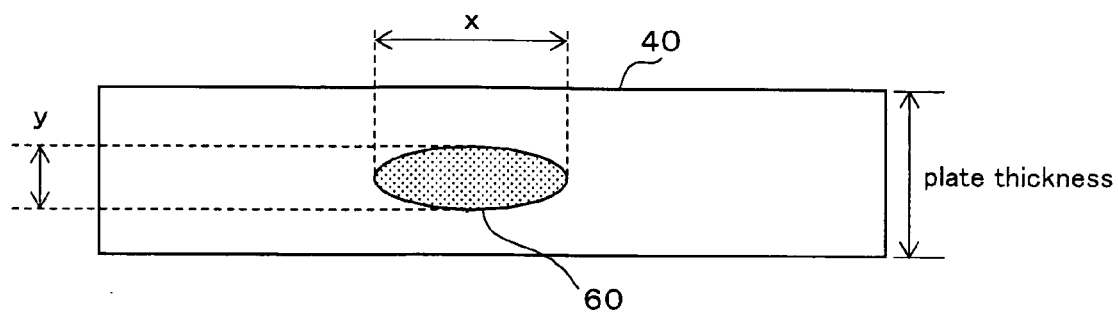
FIG. 6 is a cross-section diagram of the material plate for explaining the definition of the Feret diameters x and y.
Figure 7:
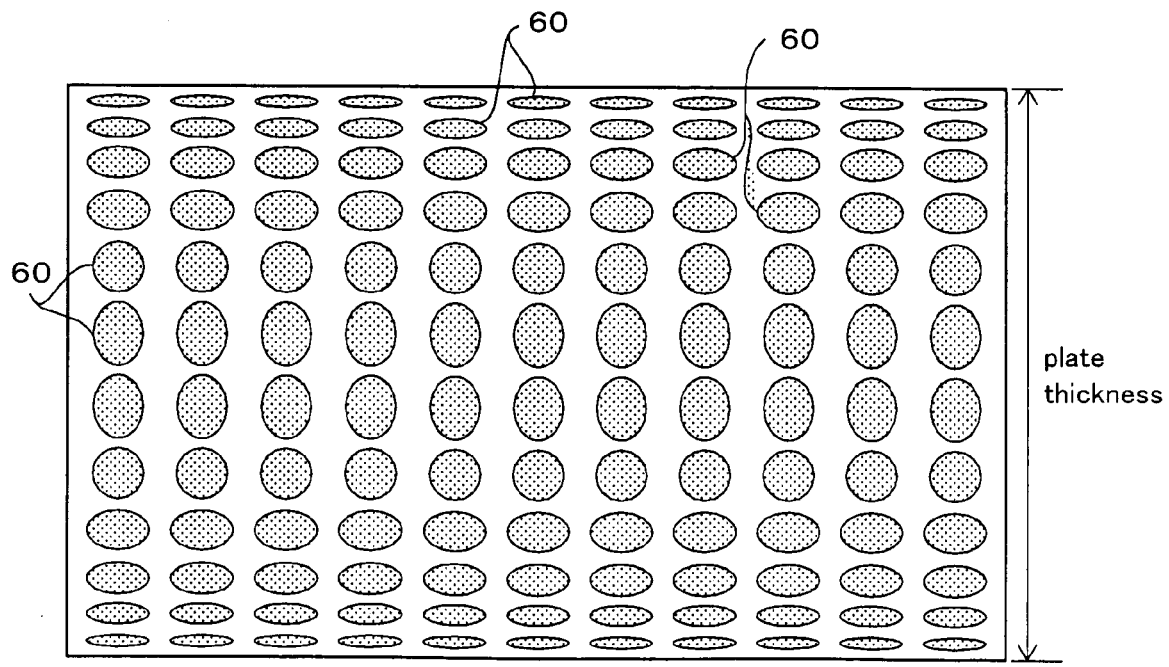
FIG. 7 is a pattern diagram in cross-section of the rolled steel for explaining the deform condition by rolling in the plate thickness of the conductive inclusions.
Figure 8:
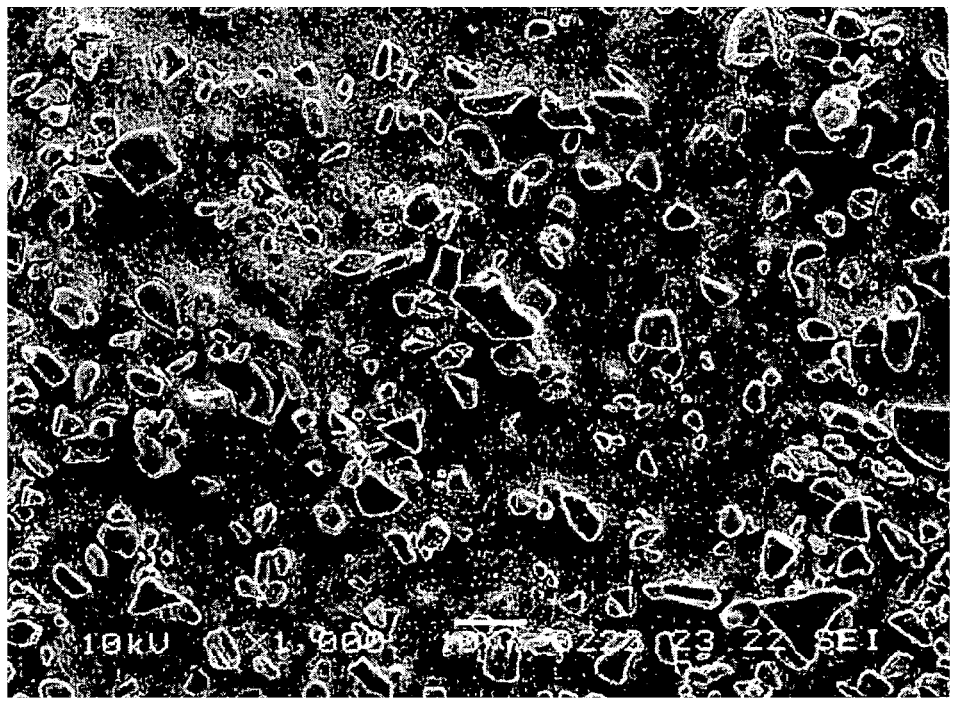
FIG. 8 is a micrograph showing the surface of the separator of practical example 1 of the present invention.
Figure 9:
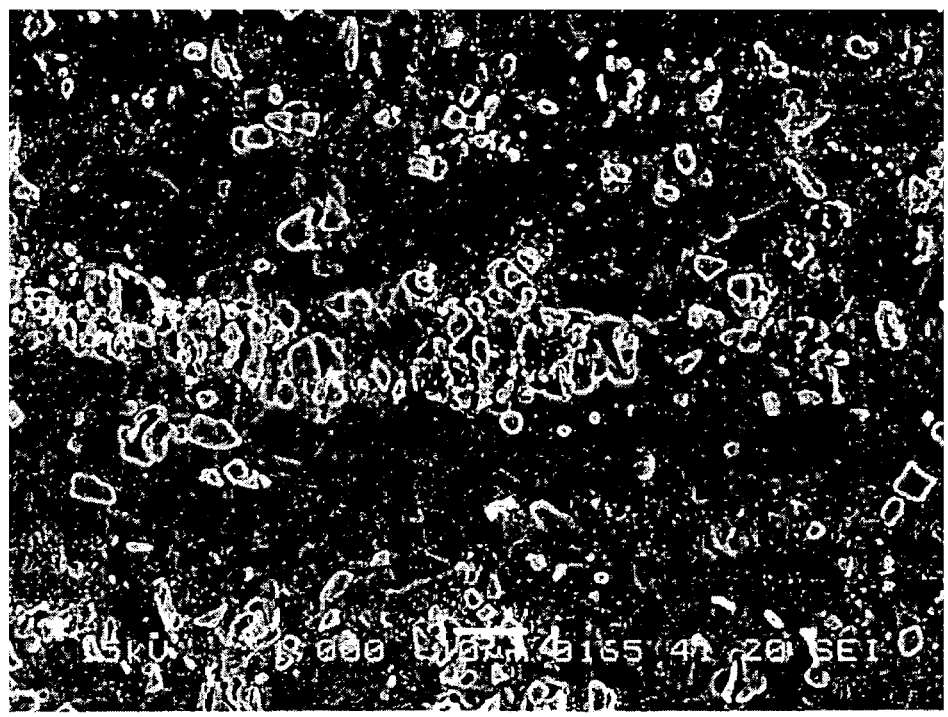
FIG. 9 is a micrograph showing the surface of the separator of comparative example 1 of the present invention.

Surfaces of the separators of the Practical Example 1 and Comparative Example 1 which were obtained in the above-mentioned manner were observed by using a microscope. FIG. 8 is a micrograph of the separator of the Practical Example 1 and FIG. 9 is a micrograph of the separator of the Comparative Example 1. According to the FIG. 8, conductive inclusions are apparently projecting in the Practical Example 1. On the other hand, according to the FIG. 9, the surface of the matrix and surface of the conductive inclusions are approximately flat.

C. Measurement of Contact Resistance

Figure 10:
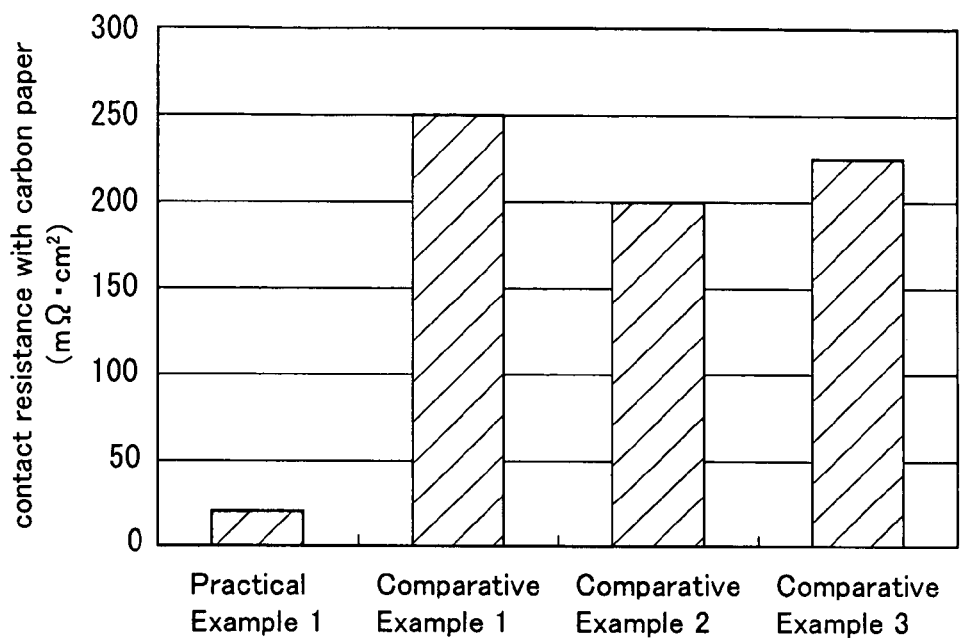
FIG. 10 is a graph showing initial values of the contact resistance measured by fuel cell unit using each separator of practical example 1 and comparative examples 1 to 3.

Next, a fuel cell unit in which separators were laminated at both sides of a MEA was formed by using the respective separator of the Practical Example 1 or Comparative Example 1 to 3, and electric power was generated by this unit, whereby the initial value of the contact resistance of separator against MEA was measured. The result is given in FIG. 10. As shown in FIG. 10, a contact resistance in the separator of the Practical Example 1 is extremely smaller than that in the separator of the Comparative Example 1, whereby an advantageous effect in the present invention in which conductive inclusions are projected from the surface of the matrix was demonstrated. Moreover, in the Comparative Example 2 in which projection amount of the conductive inclusions from the matrix was smaller than the projection amount of the range in the present invention, the contact resistance was not adequately reduced. On the other hand, in the Comparative Example 3 in which the projection amount of the conductive inclusions from the matrix was larger than the projection amount of the range in the present invention, the conductive inclusions fell off of the surface of the matrix, whereby the contact resistance of the separator in Comparative Example 3 was approximately similar to that of Comparative Example 1 in which the projection process was not performed.

(2) A Practical Example of the Present Invention in Relation to the Second Purpose D. Producing a Separator

PRACTICAL EXAMPLE 2

An austenitic stainless steel plate which contains respective components shown in Table 2, balance of Fe, and inevitable impurities, and had a thickness of 0.2 mm was prepared, and the stainless steel was cut into a 100 mm square, whereby a material plate of separator was obtained. Next, shower of iron chloride solution kept at 40° C. which has 40° Be (Baume degree for heavy solution) was sprayed for 30 seconds at a spraying pressure of 1 kg/cm$^2$, whereby chemical etching was performed. Furthermore, the material plate was press-formed at a press load of 50 tons, whereby a separator in the Practical Example 2 was formed.

PRACTICAL EXAMPLE 3

A separator of the Practical Example 3 was obtained in a similar manner as in the Practical Example 2 except for using a physical etching at both sides of the material plate in which wet blasting obtained by mixing alumina grains having a grain diameter of 0.3 mm as an abrasive coating to water was sprayed at a spray pressure of 1 kg/cm$^2$ for 20 seconds.

COMPARATIVE EXAMPLE 4

A separator of the Comparative Example 4 was obtained in a similar manner as in the Practical Example 2 except for using a chemical etching at both sides of the material plate in which the material plate was dipped into a nitric and hydrofluoric acid bath which was composed of 20% nitric acid and 8% hydrofluoric acid and was held at 30° C. in a condition of jet agitation for 30 minutes.

COMPARATIVE EXAMPLE 5

A separator of the Comparative Example 5 was obtained in a similar manner as in the Practical Example 2 except for using a physical etching at both sides of the material plate in which dry sand blasting obtained by using alumina grains having a grain diameter of 0.3 mm as an abrasive coating was sprayed at a spray pressure of 2 kg/cm$^2$ for 10 seconds.

Figure 11:
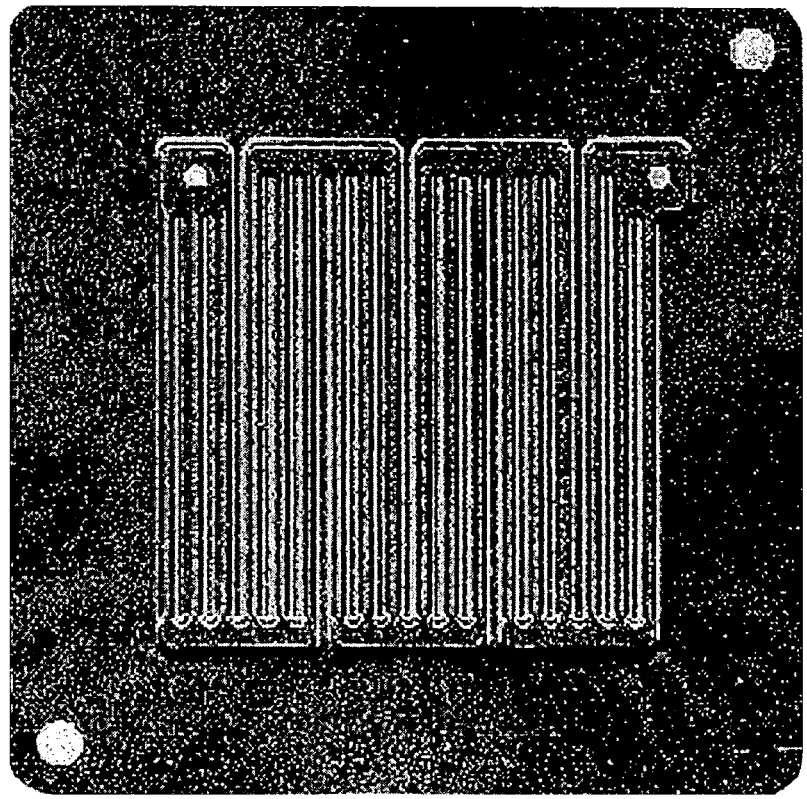
FIG. 11 is a planar photograph showing a separator produced in the practical examples of the present invention.
Figure 12:
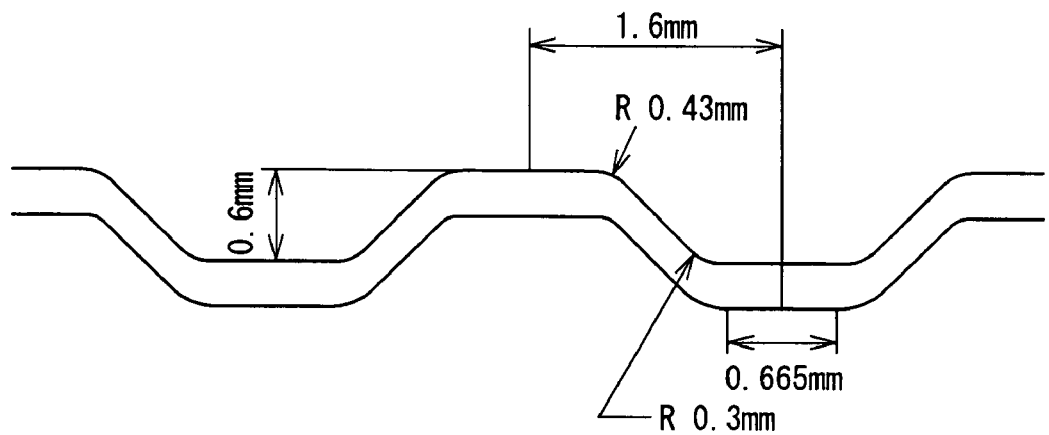
FIG. 12 is a cross-section diagram showing a concavity and convexity forming portion of the separator produced in the practical examples of the present invention.

FIG. 11 shows an entirely flat surface of separators made by the above-mentioned Practical Examples or Comparative Examples. Moreover, FIG. 12 shows a partially cross-sectional surface of concavo-convex forming portions of the separators and shows designing dimensions.

E. Observation of Cross Section of Surface Layer

Figure 13:
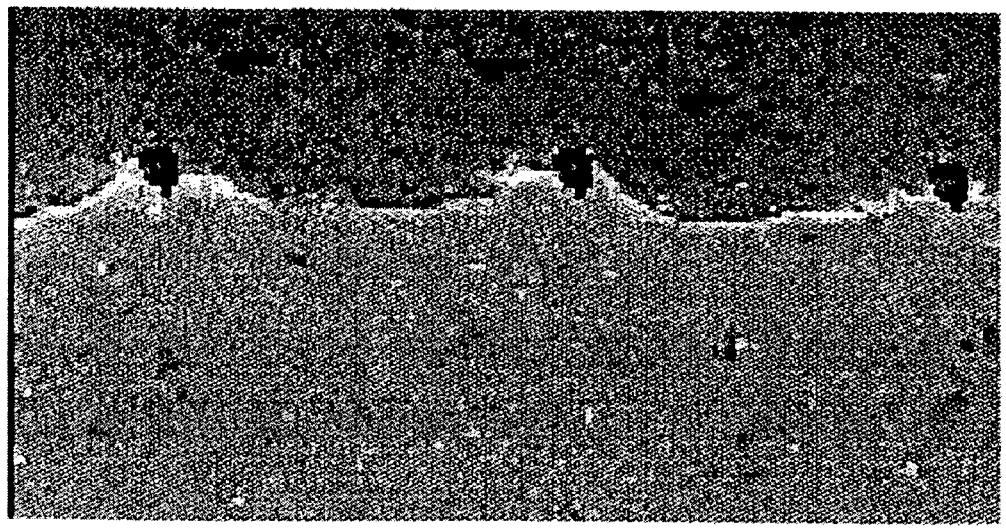
FIG. 13 is a micrograph showing a cross section of the surface layer of the separator of the practical example 2 of the present invention.
Figure 14:
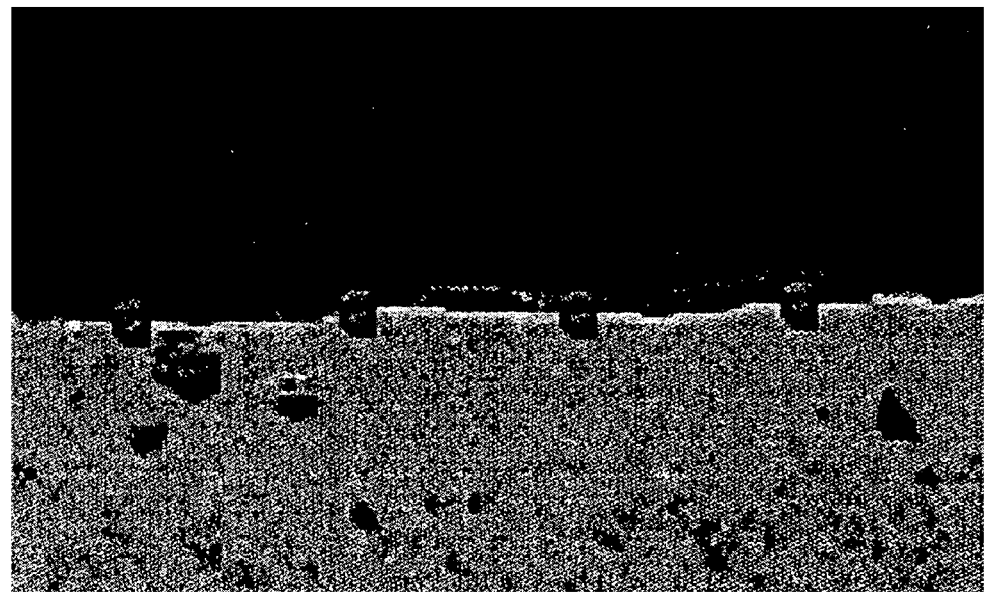
FIG. 14 is a micrograph showing a cross section of the surface layer of the separator of the comparative example 4 of the present invention.

Cross section of surface layer of the separators of the Practical Examples 2 and 3 and Comparative Examples 4 and 5 which were obtained in the above-mentioned manner were observed by using a microscope. FIG. 13 is a micrograph of the separator of the Practical Example 2 and FIG. 14 is a micrograph of the separator of the Comparative Example 4. According to the FIG. 13, in the separator of the Practical Example 2, conductive inclusions are apparently projecting from the top of mound of the matrix which projects like a hill. On the other hand, according to the FIG. 14, in the separator of the Comparative Example 4, the surface of the matrix is approximately flat, and the conductive inclusions are projected from the surface of the matrix. Additionally, as the result of the observation by microscope, the surface layer portion of the separator of the Practical Example 3 was in a similar condition as that of Practical Example 2. Moreover, surface layer portion of the separator of the Comparative Example 5 was in a similar condition as that of Comparative Example 4.

F. Measurement of Incidence Rate of Cracks

In the separators of the Practical Examples 2 and 3, and Comparative Examples 4 and 5, test pieces of 10 mm×20 mm were cut by a wire-cut method, so as to include an R portion bent by press-forming. These test pieces were filled in thermoset phenol resin of a cylinder shape having 30 mm of diameter by a hydraulic automatic machine for filling resin so as to set 20 mm cross-sections to an observation faces. The observation faces of the test pieces were polished by waterproof abrasive papers of #600 and #1000 in that order. Next, the observation faces of the test pieces were polished by buffing by using diamond pastes of 3 micrometers and 0.25 micrometers in that order, whereby the faces were shaped into mirror finished surfaces. The observed faces of these test pieces were imaged at a magnification of 400 times by an inverted metaloscope, whereby a number of pieces (a) of conductive inclusions around which cracks were not formed, and a number of pieces (b) of conductive inclusions around which cracks were formed were measured using the obtained pictures. Moreover, the measurement was continued until a value of a+b became 1000, and incidence rates of cracks were calculated by applying values of a and b to the following formula (D).

$$\text{incidence rates of cracks (\%)} = \{b/(a+b)\} \times 100 \quad \text{(D)}$$

Figure 15:
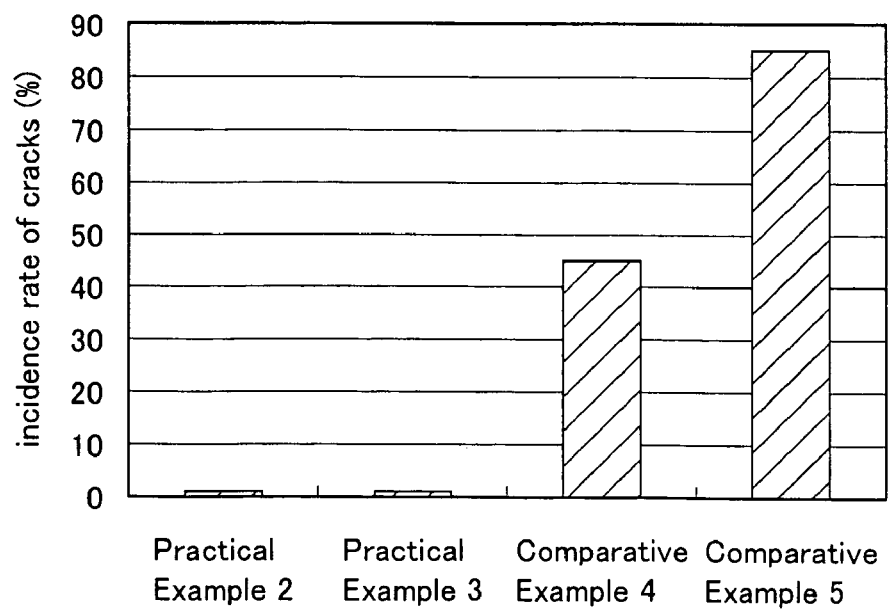
FIG. 15 is a result of the incidence rate of the crack in the practical examples 2 and 3, and in the comparative example 4 and 5.

Table 3 and FIG. 15 show the results of the above-mentioned measurements. As shown in these results, the incidence rate of crack in separators of Practical Examples 2 and 3 was much less than that of Comparative Examples 4 and 5, whereby advantageous effects of the present invention were demonstrated. Additionally, in the case in which the incidence rate of cracks is not more than 2%, there is no problem in the service life of the separator for a fuel cell.

TABLE 3

|  | incidence rate of crack (%) |
|---|---|
| Practical Example 1 | 1 |
| Practical Example 2 | 1 |
| Comparative Example 1 | 45 |
| Comparative Example 2 | 85 |

(3) Practical Example of the Present Invention in Relation to the Third Purpose

G. Fall Off Rate

Continuous casting was conducted on an austenitic stainless steel which contained respective components shown in Table 2, balance of Fe, and inevitable impurities, yielding a slab. Next, the slab was rolled in 11 different rolling reductions in a final rolling process, as shown in Table 2 (material plates 1 to 11), whereby 11 different material plates which were different of the rolling reductions and had thickness of 0.2 mm were obtained. Furthermore, these 11 different material plates were cut to 100 mm squares. These material plates are different from the average area in the cross section in the direction of plate thickness of conductive inclusions by making the rolling reductions different in the final rolling process. Table 4 shows predetermined rolling reductions and the average areas (square of micrometers) of the conductive inclusions in material plates rolled by the rolling reductions. Additionally, the average areas were obtained by micrographs.

TABLE 4

| material plate | rolling reductions in final rolling process (%) | average areas of conductive inclusions in material plates (μm$^2$) |
|---|---|---|
| 1 | 10 | 308 |
| 2 | 20 | 115 |
| 3 | 27.3 | 28.2 |
| 4 | 32.7 | 13.4 |
| 5 | 40.9 | 7.1 |
| 6 | 50 | 3.14 |
| 7 | 53 | 2.8 |
| 8 | 55 | 2.25 |
| 9 | 58 | 1.66 |
| 10 | 60 | 1.15 |
| 11 | 65 | 0.78 |

The 11 different material plates, in which the average areas in the direction of the plate thickness of the conductive inclusions were different by making the rolling reductions different in the rolling as the above-mentioned manner, were pressed at a load of 3 tons by using flat metal form (stool). The average areas S (square of micrometers) in the direction of the plate thickness of the conductive inclusions of the material plates 1 to 11 after the press were measured, and moreover, the values of S were applied to the following formula (E). These values are given in Table 5.

$$0.56 \times S^{1/2} \quad (E)$$

TABLE 5

| material plate | average areas of conductive inclusions in material plates (μm²) | $0.56 \times S^{1/2}$ | fall off rate of conductive inclusion (%) |
|---|---|---|---|
| 1 | 308 | 9.82796011 | 1 |
| 2 | 115 | 6.00533097 | 1 |
| 3 | 28.2 | 2.97380564 | 2 |
| 4 | 13.4 | 2.04993658 | 2 |
| 5 | 7.1 | 1.49216621 | 3 |
| 6 | 3.14 | 0.99232253 | 2 |
| 7 | 2.8 | 0.93705923 | 20 |
| 8 | 2.25 | 0.84 | 32 |
| 9 | 1.66 | 0.72150953 | 46 |
| 10 | 1.15 | 0.6005331 | 60 |
| 11 | 0.78 | 0.49457861 | 76 |

Moreover, fall off rates of these conductive inclusions in the material plate 1 to 11 after the pressing were obtained as follows. Test pieces having dimensions of 10 mm×20 mm were cut from the material plate wire-cut way, and these test pieces were immersed in phenol resin, which as cylindrical, 30 mm in diameter, and was thermoset, by a hydraulic automatic machine for filling resin so as to set 20 mm cross-sections at faces to be observed. The faces to be observed of the test pieces were polished with waterproof abrasive papers of #600 and #1000, in that order. Next, the faces to be observed of the test pieces were polished by buffing by using diamond pastes of 3 micrometers and 0.25 micrometers, in that order, whereby the faces were formed into mirror finished surfaces. The observed faces of these test pieces were imaged at 400× magnification by an inverted metaloscope, whereby a number of pieces (a) of conductive inclusions which were projecting from the matrix, and a number of pieces (b) of holes which were formed by falling of the conductive inclusions from the matrix, were measured by the obtained pictures. Moreover, the measurement was continued until a value of a+b became 1000, and fall off rates of the conductive inclusions were calculated by applying values of a and b to the following formula (F).

$$\text{fall off rates of conductive inclusions (\%)} = \{b/(a+b)\} \times 100 \quad (F)$$

The result of the fall off rates is also given in the Table 5.

Next, the material plates 1 to 6 were selected from the above-mentioned material plates 1 to 11, these 6 different material plates were press-formed to obtain the separators as shown in FIG. 11 by 5 different dies for the test, of which the minimum bending R was respectively 50 micrometers, 100 micrometers, 200 micrometers, 300 micrometers, and 500 micrometers, whereby separators of samples Nos. 1 to 30 were obtained. Table 6 shows a combination of the values r (micrometers) of minimum bending R in separators of samples Nos. 1 to 30 and the average areas (square of micrometers) in the cross section in the direction of plate thickness of conductive inclusions. Furthermore, values obtained by applying the r and S to the above-mentioned formula (E) and to the following formula (G) are also shown in Table 6.

$$1.77 \times S^{1/2} \div r \quad (G)$$

TABLE 6

| sample No. | material plate | r (μm) | S (μm) | $1.77 \times S^{1/2}/r$ | $0.56 \times S^{1/2}$ | fall off rate of conductive inclusion (%) |
|---|---|---|---|---|---|---|
| 1 | 6 | 50 | 3.14 | 0.0627896 | 0.99232253 | 2 |
| 2 | 5 | 50 | 7.1 | 0.094326221 | 1.49216621 | 5 |
| 3 | 4 | 50 | 13.4 | 0.129585277 | 2.04993658 | 86 |
| 4 | 3 | 50 | 28.2 | 0.187987 | 2.97380564 | 88 |
| 5 | 2 | 50 | 115 | 0.379622707 | 6.00533097 | 91 |
| 6 | 1 | 50 | 308 | 0.621267479 | 9.82796011 | 95 |
| 7 | 6 | 100 | 3.14 | 0.03136448 | 0.99232253 | 4 |
| 8 | 5 | 100 | 7.1 | 0.047163111 | 1.49216621 | 2 |
| 9 | 4 | 100 | 13.4 | 0.064792638 | 2.04993658 | 2 |
| 10 | 3 | 100 | 28.2 | 0.0939935 | 2.97380564 | 4 |
| 11 | 2 | 100 | 115 | 0.189811354 | 6.00533097 | 88 |
| 12 | 1 | 100 | 308 | 0.310633739 | 9.82796011 | 90 |
| 13 | 6 | 200 | 3.14 | 0.01568224 | 0.99232253 | 3 |
| 14 | 5 | 200 | 7.1 | 0.023581555 | 1.49216621 | 2 |
| 15 | 4 | 200 | 13.4 | 0.032396319 | 2.04993658 | 3 |
| 16 | 3 | 200 | 28.2 | 0.04699675 | 2.97380564 | 3 |
| 17 | 2 | 200 | 115 | 0.094905677 | 6.00533097 | 5 |
| 18 | 1 | 200 | 308 | 0.15531687 | 9.82796011 | 88 |
| 19 | 6 | 300 | 3.14 | 0.010454827 | 0.99232253 | 3 |
| 20 | 5 | 300 | 7.1 | 0.015721037 | 1.49216621 | 2 |
| 21 | 4 | 300 | 13.4 | 0.021597546 | 2.04993658 | 2 |
| 22 | 3 | 300 | 28.2 | 0.031331167 | 2.97380564 | 2 |
| 23 | 2 | 300 | 115 | 0.063270451 | 6.00533097 | 3 |
| 24 | 1 | 300 | 308 | 0.10354458 | 9.82796011 | 6 |
| 25 | 6 | 500 | 3.14 | 0.006272896 | 0.99232253 | 2 |
| 26 | 5 | 500 | 7.1 | 0.009432622 | 1.49216621 | 3 |
| 27 | 4 | 500 | 13.4 | 0.012958528 | 2.04993658 | 2 |
| 28 | 3 | 500 | 28.2 | 0.0187987 | 2.97380564 | 2 |
| 29 | 2 | 500 | 115 | 0.037962271 | 6.00533097 | 2 |
| 30 | 1 | 500 | 308 | 0.062126748 | 9.82796011 | 3 |

Separators of samples Nos. 1 to 30 produced as mentioned above were cut by a wire-cut method so as to include the R portion in which the bending processes were performed, whereby test pieces of 10 mm×20 mm were obtained. Fall off rates of the conductive inclusions in the bending process portion were obtained by using these test pieces in the manner as described above.

The fall off rates described above are also given in Table 6. Moreover, the relationship of the values of the formula (G) and fall off rates of the conductive inclusions was researched with samples in which the values in the formula (E) were not less than 1, and the results are shown in a graph in FIG. 16. Furthermore, FIG. 17 shows a graph of relationships of the values in the formula (E) and fall off rates of the conductive inclusions, in the material plates 1 to 11 after press-forming, i.e., in a plate portion in which the bending process was not performed.

Figure 16:
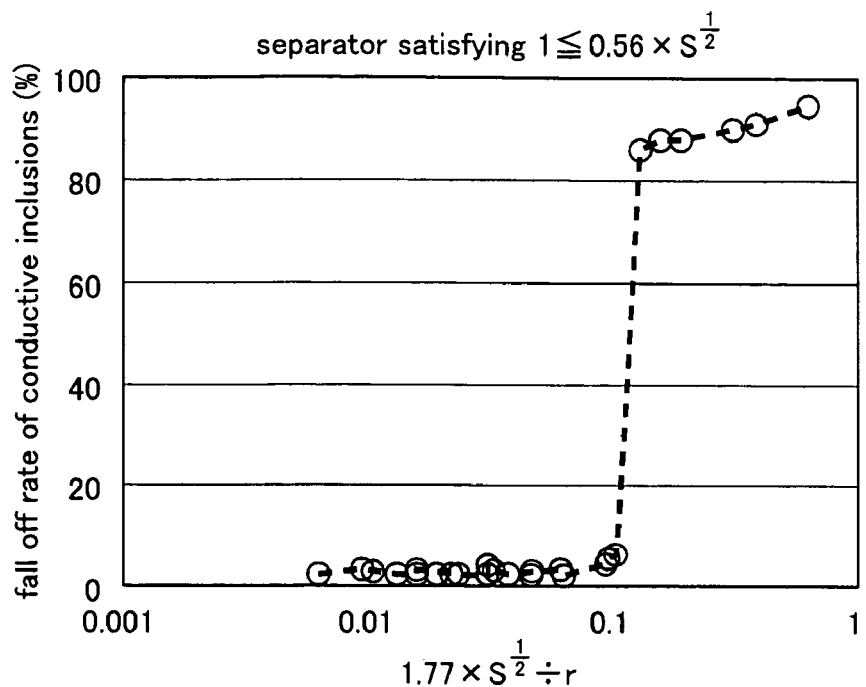
FIG. 16 is a diagram showing falling off rates of the conductive inclusions in an R portion obtained by the practical examples.
Figure 17:
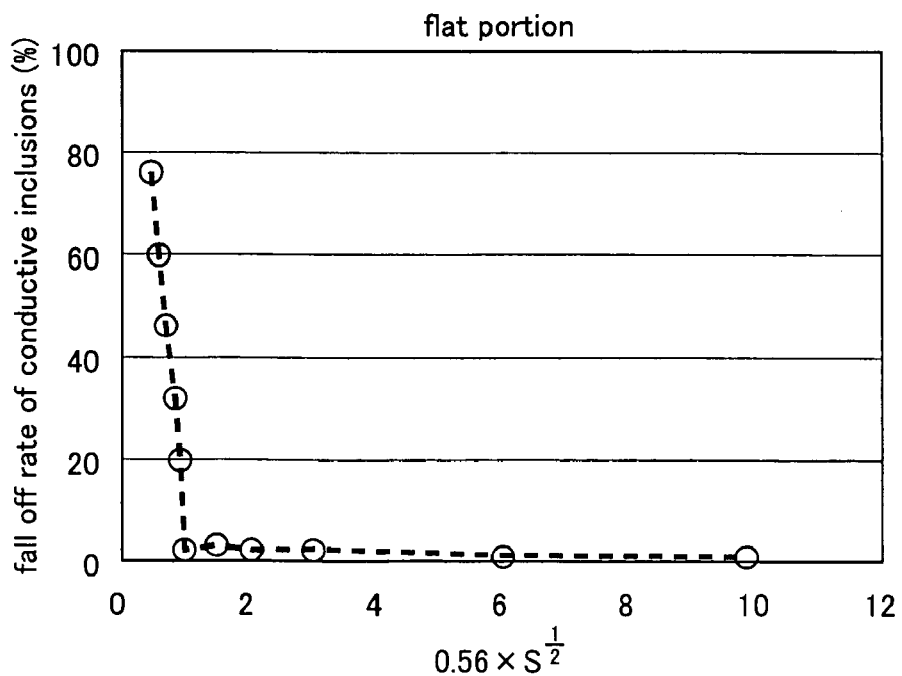
FIG. 17 is a diagrams showing falling off rates of the conductive inclusions in flat material plate by the practical examples.

According to the Table 6 and FIG. 16, the fall off rates of conductive inclusions of separators fulfilled the conditions in which the values of formula (E) are not less than 1 and the values in the formula (G) are not more than 1, are 2 to 3%, and 5% at most. On the other hand, the fall off rates of conductive inclusions of separators in which the values in the formula (G) are more than 1 are extremely high of around 90%. Therefore, the effect of the present invention was demonstrated. Additionally, according to FIG. 17, it is apparent in the flat portion that if the values of the above-mentioned formula (E) are not less than 1, the fall off rates considerably decrease.

(4) A Practical Example of the Present Invention in Relation to the Fourth Purpose H. Producing a Separator Continuous casting was conducted on an austenitic stainless steel which contained respective components shown in Table 2, balance of Fe, and inevitable impurities. Next, an obtained slab was cold-rolled to 28 different thicknesses of 0.2 mm to 0.47 mm as shown in Table 7, whereby material plates of samples Nos. 1 to 28 were obtained. Furthermore, these 28 different material plates were cut to 200 mm squares, and a heat treatment was performed at 1100° C. in nitrogen gas for 10 minutes. After the heat treatment, electrolytic polishing was performed by using a phosphoric acid type of battery electrolyte (produced by Jasuko: 6C 016), whereby both surfaces were polished, resulting in setting the thickness to be 0.2 mm. Furthermore, the average value of the Feret diameter in the face direction of the cross-section of the plate thickness of the conductive inclusion was defined as x, the average value of the Feret diameter in the plate thickness direction of the conductive inclusion was defined as y, and 28 different material plates (samples Nos. 1 to 28) in which the value of x/y was set to be different were obtained. Table 7 shows electrolytic polishing amount on one surface of the material plate and thickness after the polishing. Moreover, Table 8 shows values of the x/y of samples Nos. 1 to 28. The value of the x/y could be controlled by the cooling rate in the continuous casting, heat treatment condition (temperature× time) after the rolling, or the polishing of the surface.

TABLE 7

| sample No. | plate thickness of cold-rolling (mm) | electrolytic polishing amount on one surface (mm) | plate thickness after polishing (mm) |
| --- | --- | --- | --- |
| 1 | 0.2 | 0 | 0.2 |
| 2 | 0.21 | 0.005 | 0.2 |
| 3 | 0.22 | 0.01 | 0.2 |
| 4 | 0.23 | 0.015 | 0.2 |
| 5 | 0.24 | 0.02 | 0.2 |
| 6 | 0.25 | 0.025 | 0.2 |
| 7 | 0.26 | 0.03 | 0.2 |
| 8 | 0.27 | 0.035 | 0.2 |
| 9 | 0.28 | 0.04 | 0.2 |
| 10 | 0.29 | 0.045 | 0.2 |
| 11 | 0.3 | 0.05 | 0.2 |
| 12 | 0.31 | 0.055 | 0.2 |
| 13 | 0.32 | 0.06 | 0.2 |
| 14 | 0.33 | 0.065 | 0.2 |
| 15 | 0.34 | 0.07 | 0.2 |
| 16 | 0.35 | 0.075 | 0.2 |
| 17 | 0.36 | 0.08 | 0.2 |
| 18 | 0.37 | 0.085 | 0.2 |
| 19 | 0.38 | 0.09 | 0.2 |
| 20 | 0.39 | 0.095 | 0.2 |
| 21 | 0.4 | 0.1 | 0.2 |
| 22 | 0.41 | 0.105 | 0.2 |
| 23 | 0.42 | 0.11 | 0.2 |
| 24 | 0.43 | 0.115 | 0.2 |
| 25 | 0.44 | 0.12 | 0.2 |
| 26 | 0.45 | 0.125 | 0.2 |
| 27 | 0.46 | 0.13 | 0.2 |
| 28 | 0.47 | 0.135 | 0.2 |

TABLE 8

| sample No. | x/y | fall off rate of conductive inclusion (%) | rate of conductive inclusion which was source of generating cracks (%) |
| --- | --- | --- | --- |
| 1 | 0.2 | 91 | 0 |
| 2 | 0.3 | 85 | 0 |
| 3 | 0.35 | 80 | 0 |
| 4 | 0.4 | 74 | 0 |
| 5 | 0.45 | 66 | 0 |
| 6 | 0.47 | 62 | 0 |
| 7 | 0.48 | 58 | 0 |
| 8 | 0.49 | 55 | 0 |
| 9 | 0.5 | 0 | 0 |
| 10 | 0.6 | 0 | 0 |
| 11 | 0.7 | 0 | 0 |
| 12 | 0.8 | 0 | 0 |
| 13 | 0.9 | 0 | 0 |
| 14 | 1 | 0 | 0 |
| 15 | 1.1 | 0 | 0 |
| 16 | 1.15 | 0 | 0 |
| 17 | 1.17 | 0 | 0 |
| 18 | 1.19 | 0 | 0 |
| 19 | 1.2 | 0 | 0 |
| 20 | 1.21 | 0 | 13.4 |
| 21 | 1.23 | 0 | 14 |
| 22 | 1.25 | 0 | 15 |
| 23 | 1.3 | 0 | 17 |
| 24 | 1.4 | 0 | 16 |
| 25 | 1.5 | 0 | 18 |
| 26 | 1.6 | 0 | 17 |
| 27 | 2 | 0 | 22 |
| 28 | 2.5 | 0 | 19 |

The material plates of samples Nos. 1 to 28 were respectively press-formed at a press load of 50 ton, whereby the separators were obtained. FIG. 11 shows the entire surface of the separator which will be formed, and FIG. 12 shows partial cross-sections of the concavity and convexity formed portion of the separator, and shows design dimensions.

I. Measurement of Fall Off Rate of Conductive Inclusions and Rate of Conductive Inclusions which was a Source of Generating Cracks Separators of samples Nos. 1 to 28 produced as mentioned above were cut by wire-cut way so as to include the R portion in which the bending process were performed, whereby test pieces having shapes of 10 mm×20 mm were obtained. These test pieces were filled in thermoset phenol resin of a cylindrical shape, 30 mm in diameter, by a hydraulic automatic machine for filling resin so as to set 20 mm cross-sections at observation faces. The observation faces of the test pieces were polished by waterproof abrasive papers of #600 and #1000, in that order. Next, the observation faces of the test pieces were polished by buffing by using diamond pastes of 3 micrometers and 0.25 micrometers, in that order, whereby the faces were shaped into mirror finished surfaces. The observation faces of these test pieces were imaged at 400× magnification by an inverted metaloscope, whereby fall off rate of conductive inclusions and rate of conductive inclusions which was a source of generating cracks were measured as described hereinafter from the obtained pictures.

a) Fall off Rate of Conductive Inclusion

A number of pieces (a) of conductive inclusions which were projecting from the matrix, and a number of pieces (b) of holes which were formed by falling off the conductive inclusions from the matrix were measured. Moreover, the measurement was continued until a value of a+b became 1000, and falling off rates of the conductive inclusions were calculated by applying values of a and b to formula (F).

b) Rate of Conductive Inclusion which was a Source of Generating Cracks

A number of pieces (a) of conductive inclusions which were, projecting from the matrix, and a number of pieces (c) of conductive inclusions which were a source of generating cracks in the matrix were measured. Moreover, the measurement was continued until a value of a+c became 1000, and rates of the conductive inclusions which were a source of generating cracks were calculated by applying values of a and c to formula (H).

Rate (percentage) of conductive inclusions which were a source of generating cracks=$\{c/(a+c)\} \times 100$     (H)

Figure 18:
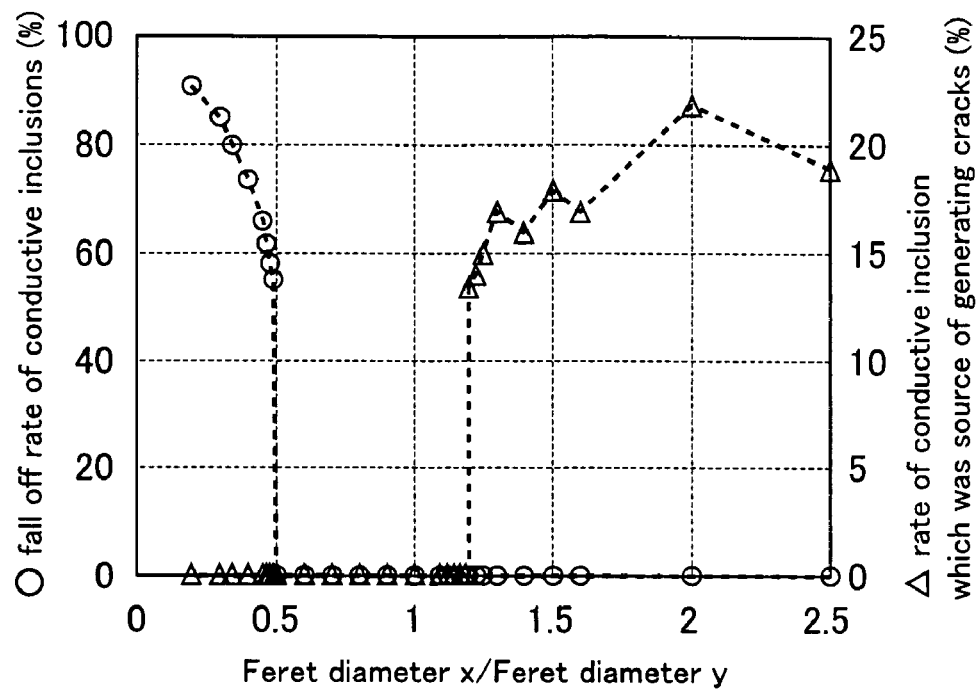
FIG. 18 is a diagram showing a measured result of the practical example of the present invention.

The results of the above-mentioned measurements are shown in Table 8 and are shown in a graph of FIG. 18.

According to the above-mentioned result and FIG. 18, when the value of x/y is not less than 0.5, the fall off rate is held at 0. In contrast, when the value of x/y is less than 0.5, the fall off rate is drastically increased. Moreover, when the value of x/y is not more than 1.2, cracks are not generated due to the conductive inclusions. However, when the value of x/y is more than 1.2, cracks are generated due to the conductive inclusions. Therefore, it is demonstrated that fall off of conductive inclusions and generating cracks due to conductive inclusions can be prevented by controlling the value of x/y to be 0.5 to 1.2 in the case in which the average value of the Feret diameter in the face direction of the cross-section of the plate thickness of the conductive inclusion is defined as x and the average value of the Feret diameter in the plate thickness direction is defined as y.

(5) A Practical Example of the Present Invention in Relation to the Fifth Purpose J. Producing a Separator

PRACTICAL EXAMPLE 4

An austenitic stainless steel plate which contains respective components shown in Table 9 and having a thickness of 0.2 mm was prepared, and the stainless steel plate was cut into 100 mm squares. Additionally, in this stainless steel plate, B is precipitated in a metal structure as a boride of the $M_2B$ and the MB type, or as a boride of $M_{23}(C, B)_6$ type, and these borides are conductive inclusions which form conductive paths on the surface of the separators.

c) Projection Process of Conductive Inclusion

Next, the passivated-separator material plate was dipped into an electrolytic etching bath, whereby the conductive inclusions were projecting on the surface of the separator, resulting in obtaining a separator of Practical Example 4. In the electrolytic etching, phosphoric acid type of battery electrolyte (produced by Jasuko: 6C 016) was used, and the etching was performed under conditions of 50° C. of the temperature and 0.125 A/cm² current density.

COMPARATIVE EXAMPLE 6

The projection process was conducted on the separator material plate in which press-forming was performed without performing the passivation process in the above-mentioned practical example 4, whereby a separator of Comparative Example 6 was obtained.

K. Measurement of Contact Resistance

Figure 19:
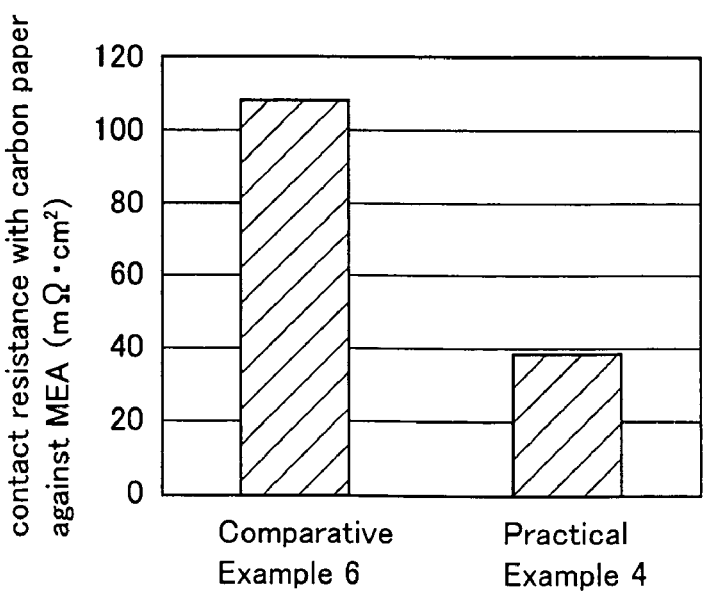
FIG. 19 is a graph showing the initial value of the contact resistance of the contact resistance measured in practical example 4 and comparative example 6.

Next, separators were laminated on both sides of the membrane electrode assembly (MEA) by using separators of Practical Example 4 and Comparative Example 6, whereby a fuel cell unit was constructed. Then electric power was generated by the unit, and initial value of the contact resistance of the separator against the MEA was measured. The results are shown in FIG. 19. As shown in FIG. 19, the contact resistance of the separator of Practical Example 4 is considerably lower than that of Comparative Example 6. Therefore, the effect generated by the passivation process of the present invention was demonstrated.

The invention claimed is:

1. A production method for a metallic separator for a fuel cell by press-forming, comprising:

TABLE 9

| | | | | | | | | | | | | (wt %) |
|---|---|---|---|---|---|---|---|---|---|---|---|---|
| C | Si | Mn | P | S | Cu | Ni | Cr | Mo | Al | N | B | Fe |
| 0.021 | 0.27 | 0.12 | 0.02 | 0.001 | 0.1 | 12.3 | 20.9 | 1.94 | 0.14 | 0.025 | 0.6 | balance | a) Press-forming

The above-mentioned stainless steel plate was press-formed to obtain separator material plates which were 92 mm squares. FIG. 11 shows the separator material plate. The separator material plate has a portion for power collection in the central of the plate, and the portion is concavity and convexity shape in cross section, and the separator material plate has a flat edge around the portion for power collection.

b) Passivation Process

Next, the separator material plate was dipped into a nitric acid solution bath of 50 wt % maintained at 50° C. for 10 minutes, whereby passivation was performed, and then the separator was washed with water.

projecting conductive inclusions from a surface of the separator, wherein when the minimum bending R value among one or more bending radii in the press-forming is defined as r (micrometers), wherein r is 0.05 to 0.5 mm, and an average area of the conductive inclusions in a cross-section of plate thickness direction in a separator material plate before the press-forming is defined as S (square of micrometers), r and S satisfy the formulas:

$1 \leq 0.56 \times S^{1/2}$ $1.77 \times S^{1/2} \div r \leq 0.1$.

\* \* \* \* \*